Dec. 16, 1941.  D. B. BANKS  2,266,402
FILTERING APPARATUS
Filed May 2, 1938  8 Sheets-Sheet 1

WITNESS:

INVENTOR
Daniel B. Banks
BY
Busser and Harding
ATTORNEYS.

Dec. 16, 1941.      D. B. BANKS      2,266,402
FILTERING APPARATUS
Filed May 2, 1938      8 Sheets-Sheet 2

WITNESS:

INVENTOR
Daniel B. Banks
BY
ATTORNEYS.

Dec. 16, 1941.                    D. B. BANKS                    2,266,402
                              FILTERING APPARATUS
                              Filed May 2, 1938                 8 Sheets-Sheet 5

WITNESS:

INVENTOR
Daniel B. Banks
BY
Busser and Harding
ATTORNEYS.

Patented Dec. 16, 1941

2,266,402

UNITED STATES PATENT OFFICE 2,266,402

FILTERING APPARATUS

Daniel B. Banks, Drexel Hill, Pa., assignor to Sun Oil Company, Philadelphia, Pa., a corporation of New Jersey Application May 2, 1938, Serial No. 205,566

6 Claims. (Cl. 210—200)

The present invention relates to an apparatus for filtering and particularly to an apparatus wherein a continuous process of filtering and filter cake removal can be carried out.

The dewaxing of hydrocarbon oils is at the present time being carried out by diluting the oil to be dewaxed with a liquid normally gaseous solvent-refrigerant such as propane or butane, as these hydrocarbons have the property at low temperatures of dissolving oil and reducing its viscosity to a degree permissive of proper filtration, and also of being relatively pure solvents for the wax crystallized from the oil at low temperatures. Since the dewaxing operation is carried out at extremely low temperatures, of the order of —20° F. to —70° F., and since the solvents above referred to are extremely volatile and explosive, it is necessary that filtration be carried out entirely within a closed chamber and, due to the large volumes of material which it is necessary to handle, that the operation be continuous.

It is therefore an object of the present invention to provide an apparatus wherein a continuous process of filtration and filter cake removal may be carried out.

It is also an object of the invention to provide an apparatus wherein the filter surfaces will be in contact with the filtrand for a period of time relatively long with respect to the time occupied by the removal from the filtrand of the filter for the purpose of removing the cake therefrom.

It is also an object of the invention to provide adjustable means for accurately timing the blow back for removing the cake with respect to the suction time.

It is a further object of the invention to provide sampling means enabling the filtrate being removed from each of a multiplicity of filtering units to be inspected continuously.

It is a further object of the invention to provide means for shutting off one of a multiplicity of sections of filtering elements without disassembling the entire unit.

It is a further object of the invention to insulate and separate the filtrand from heat conducting relation with the outside shell of the filter in order to prevent excessive evaporation of solvent through heat leakage into the filtrand.

It will be understood that the term "filtrand," as herein used, has an established meaning in the oil refining art and defines the mixture of oil and wax to be separated, while the term "filtrate" defines the oil after separation.

The drawings illustrate a preferred embodiment of the invention.

In order that the detailed description of the present invention may be more clearly understood, a general description of the apparatus without reference to the various figures or numerals will first be given.

The filter consists of a vertical cylindrical shell capable of withstanding either pressure or vacuum having therein a rotatable central shaft carrying a multiplicity of arms which bodily rotate in a fixed plane, and which have mounted thereon filter leaves. The central shaft at its upper end also carries arms having rollers which follow a cam track and by means of connections to the filter arms swing the filter leaves, at predetermined intervals, out of contact with the filtrand. The central shaft also contains radial supporting means for carrying the filtrate control valves, the blow back valves, control mechanism therefor and piping incidental thereto, the central shaft also serving as ingress means for the blow back gas and as egress means for the filtrate, the shaft and all of the material supported thereby being carried from a bearing structure at the top part of the vertical cylindrical chamber. Two cam mechanisms are employed, one of which is fixed with relation to an annular trough carrying the filtrand and cake removal sections and the other of which is adjustable to permit proper and regulable operation of the blow back valves. The annular trough carrying the filtrand, as well as the chute or flume through which the wax cake is dropped, are both insulated from the external shell of the apparatus in order to prevent inflow of heat to the filtrand which would result in evaporation of the solvent refrigerant employed.

Figures 1, 1A:
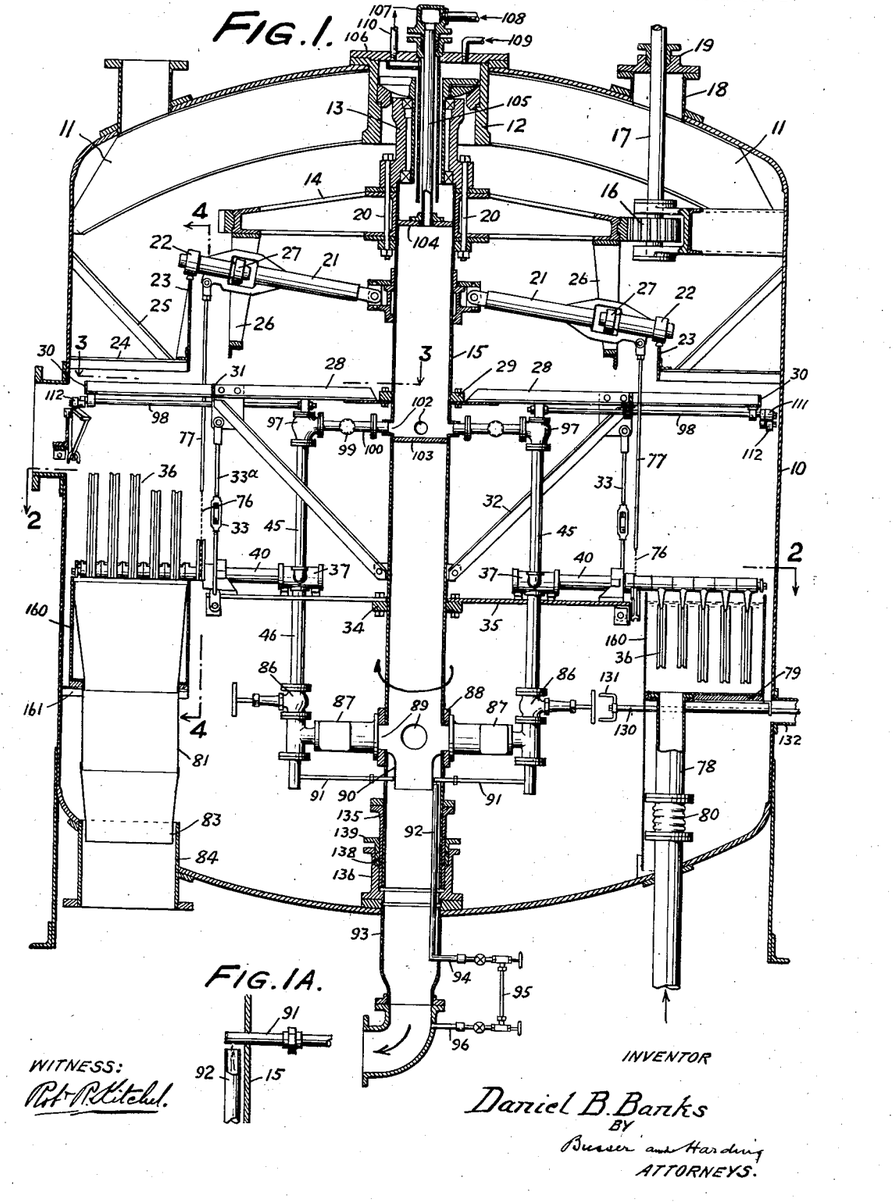
Fig. 1 is a sectional elevation of an apparatus embodying my invention.
Fig. 1A is an enlarged view showing a portion of the sampling connections.

Referring first to Fig. 1: The shell 10 contains all working parts of the filter. Across the dome of the shell are positioned a number of radial ribs 11, affixed to an annular casting 12 which supports substantially the entire weight of the working parts of the filter through a roller bearing mechanism associated therewith. This mechanism is substantially identical with that disclosed in Patent No. 2,068,257, issued January 19, 1937, to the applicant and Paul D. Barton, the main difference being that means, hereinafter described, are provided for the admission of blowback gas therethrough.

Carried by the bearing member 13, by means of bolts 20, is a large spur gear 14 which is affixed to the central shaft 15. Spur gear 14 meshes with a pinion 16 driven by a shaft 17, which extends through a nozzle 18 in the upper portion of the shell and is packed by passing through a stuffing box 19. Power is supplied to shaft 17 for rotating, through pinion 16 and spur gear 14, the shaft 15 and the mechanism carried thereby. Immediately below spur gear 14 there are pivotally connected to shaft 15, by suitable means, a multiplicity of radial arms 21 having rollers 22 affixed at their extremities. Rollers 22 are in engagement with an annular cam 23, which is supported, by suitable structure members 24 and 25, from the outer shell of chamber 10.

Figure 4:
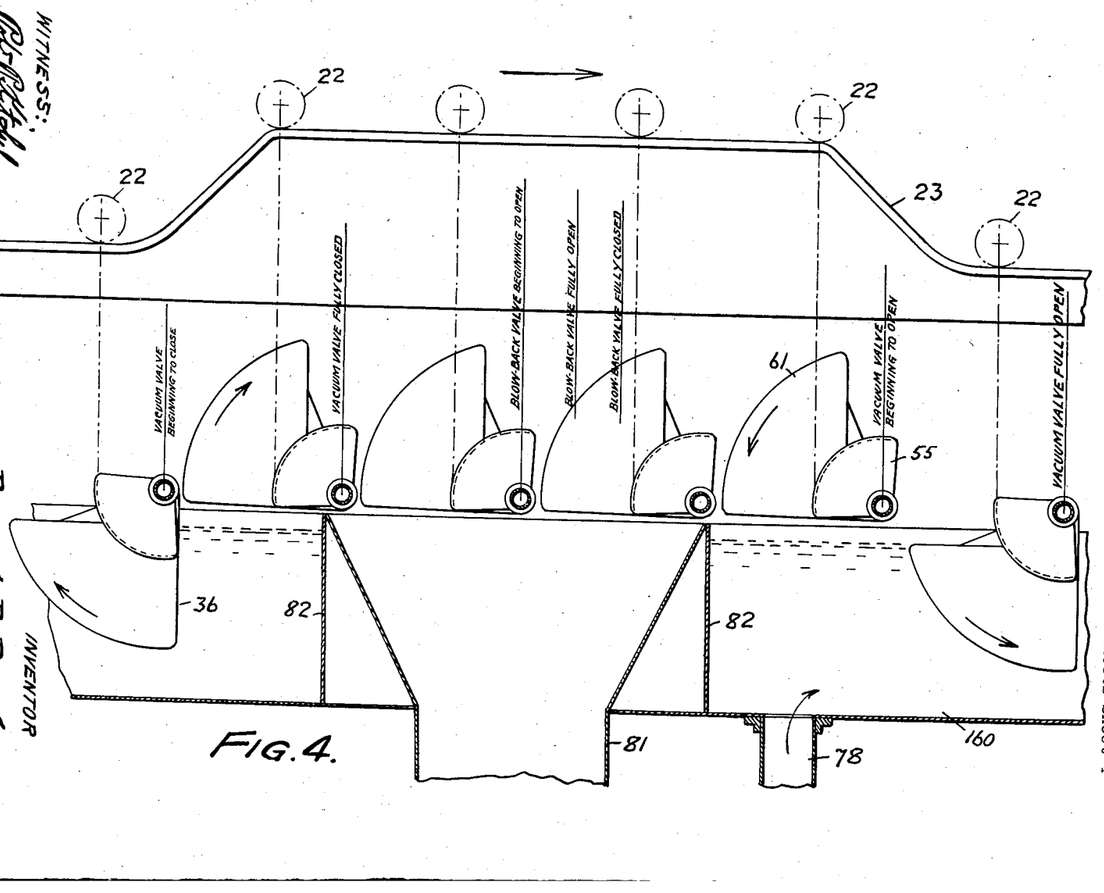
Fig. 4 is a diagrammatic illustration showing a development of the cam used for lifting the filter elements from the filtrand and showing the positions of the various valves during the filtering and filter cake removal operations.
Figures 5, 7:
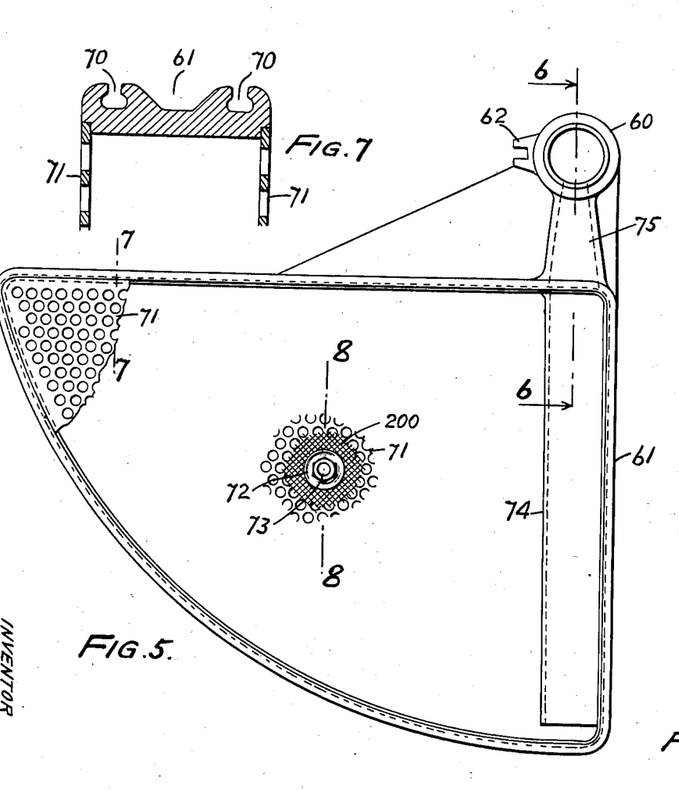
Fig. 5 is an elevation showing a single filter leaf partly broken away.
Fig. 7 is a partial section taken on line 7—7 of Fig. 5.
Figures 6, 8:
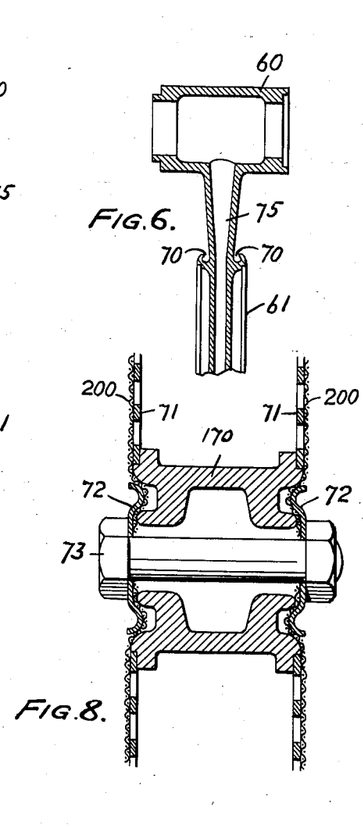
Fig. 6 is a partial section taken on line 6—6 of Fig. 5.
Fig. 8 is a section taken on line 8—8 of Fig. 5.

By reference to Fig. 4 it will be noted that cam 23 is provided with a raised portion, adjacent the blow-back section of the filter, whereby the cam necessarily effects the lifting and lowering of arms 21, which, through means hereinafter described, lift the set of filter leaves successively out of the filtrand and return them thereto after the cake has been removed. Arms 21 are guided, in the vertical movement caused by cam 23, by means of guides 26 depending from spur gear 14 and rollers 27 carried within an opening provided in the arms 21; rollers 27 following guides 26 and rollers 22 following cam 23 being placed on opposite ends of a stub shaft.

Immediately below arms 21 and cam 23 is a supporting structure comprising radial members 28 bolted to an annulus 29 welded to the shaft 15. Affixed to the extremities of radial members 28 is a circular structural element 30 (Fig. 3). Another circular structural element 31 is affixed to radial members 28 about midway between the shaft 15 and the element 30. Rigidity is given to the structure just described by means of obliquely extending anchor braces 32 bolted to brackets on the shaft 15. Supported by rods and turn buckles 33 and 33a (hung from radial members 28) and a ring 34 welded to the shaft 15 is an annular sectional plate 35 (see also Fig. 2). The structure just described supports the weight of the filter elements, valves, and piping incidental thereto as well as the rods used to control the blow back valves.

Each of the filter elements includes a tubular shaft 40 rotatable axially through an arc of about 92°. On an extension (hereinafter described) of each shaft 40 is positioned a set of filter leaves 36; five comprising a set in the present embodiment. At the inner end of tubular shaft 40 is a valve mechanism for alternately connecting the shaft with a source of vacuum for withdrawing the filtrate and a source of gas under pressure for blowing back to remove the cake from the filter leaves. This valve mechanism consists of a casting 37 (Figs. 12 and 13) having a plate 38 closing one end thereof and a gland 39 packing the tubular shaft 40, which is turnable within casting 37. The end of tube 40 is closed by a stub shaft 41 which is welded thereto and on which the inner race of a roller bearing structure 42 is placed, the outer race being set within an annular ring 43 abutting a shoulder in the casting. Tube 40 and race 42 are held in position by means of a nut 44 on the end of stub shaft 41.

Figure 12:
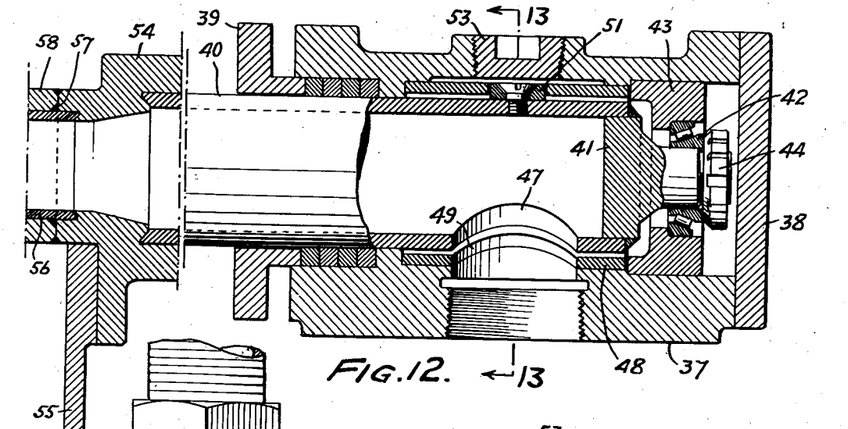
Fig. 12 is a view, partly in section, showing the valve means within the filter leaf supporting arms for alternately connecting the filter leaves with the source of vacuum and blow back.
Figure 13:
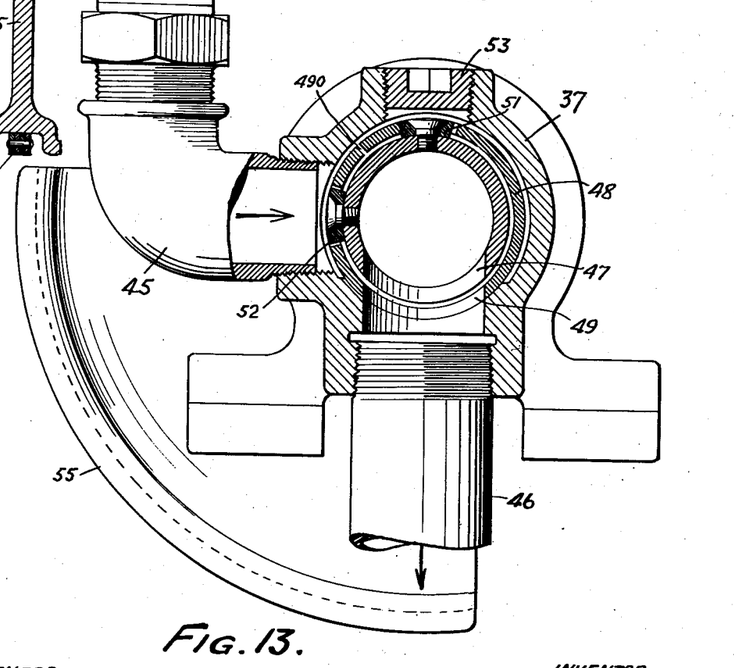
Fig. 13 is a section taken on line 13—13 of Fig. 12.
Figure 14:
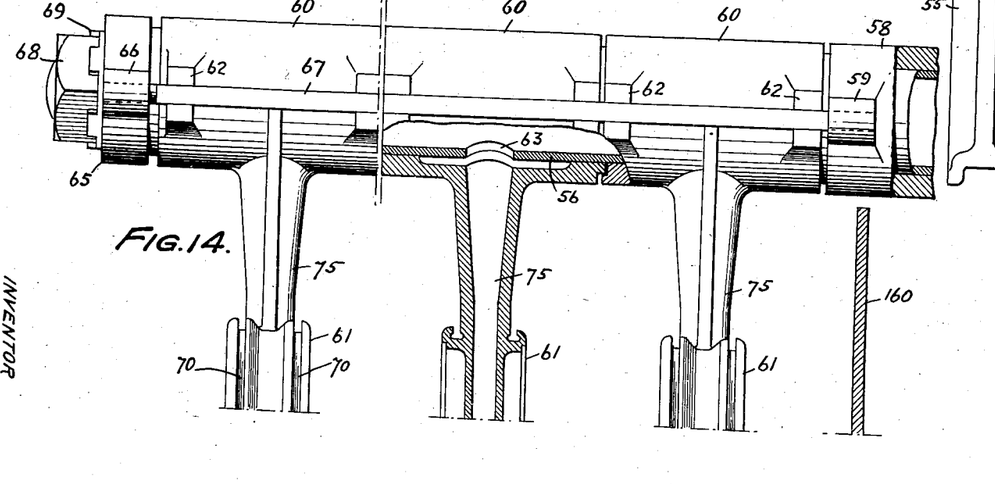
Fig. 14 is an elevation partly in section showing the filter leaves and the arm supporting them.

Casting 37 serves as a valve body to place the filter leaves in communication with both the source of vacuum and the source of blow-back gaseous fluid. Communication with the blow back is through pipe 45. Communication with the source of vacuum or filtrate outlet is through pipe 46. Tube 40 is provided with an orifice 47 for such communication. In order to provide a tight seal, an internal sleeve 48 is provided which is ground to fit the internal surface of the valve body 37. This sleeve has an orifice 49 registering with orifice 47 in tube 40. Sleeve 48 is split, as shown, at 49a and is ordinarily made larger in size than the internal ground surface on the valve body 37, so that on insertion it expands and provides a tight fit. Positioned on the tube 40 are two lugs 51 and 52, held in place by suitable screw. These lugs serve to turn the sleeve 48 with the tube 40 so that aligning openings 47 and 49 will register with one or the other of the openings leading to pipes 45 and 46, depending upon the position of the tube 40. It is readily apparent that tube 40 may be inserted and then sleeve 48, after which, the plug 53 being removed, lugs 51 and 52 may be positioned.

Figure 15:
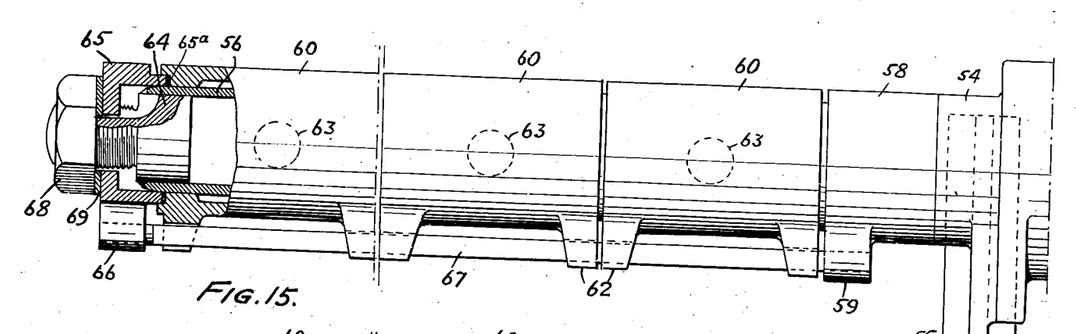
Fig. 15 is a plan view of the structure shown in Fig. 14.

Tube 40 is pressed and welded into a casting 54 which has integral therewith a quadrant 55 (see also Fig. 15) which, when actuated as hereinafter explained, effects the turning of the tube. On the opposite side of casting 54 a ground and polished tube 56 is inserted and welded thereto as shown at 57. A sleeve 58, having lugs 59 thereon, is then slipped over tube 56 and welded to the casting 54. On tube 56 the heads 60 of filter elements 36 are placed. Openings 63 in tube 56 afford communication between the filter elements and tube 56. The outer end of tube 56 is closed by a plug 64, which is welded therein, the outer end of the plug being provided with a screw thread. A gland 65 is placed over the outer end of the tube 56 together with a gasket 65a. A drilled boss 66 on the clamp aligns with slotted bosses 62 on the filter elements and lug 59 on the ring 58. A key rod 67 is then inserted and the whole structure tightened by a nut 68 having lug washer 69 between the nut and clamp 65. There is thus provided one element of the filter, having five separate leaves rigidly connected thereto, rotatable about an angle of about 92°.

Each filter element 36 consists of a casting 61 (see Figs. 5-8) having grooves 70 on the outer periphery thereof and foraminous plates 71 set within a shoulder provided in the outer rim. The filter cloth 200 is stretched over the outer faces of the casting and is held thereon by forcing the cloth into grooves 70 by means of a compressible packing such as rope, lead wire or the like. The filter cloth is prevented from bulging excessively when the blow-back gas is supplied thereto by means of spools 170 inserted within the filter and held in place by collets 72 and bolt 73. The casting 61 forming the frame of the filter element is so designed as to provide a conductor pipe 74 leading substantially to the bottom of the casting, this pipe being connected through the cored opening 75 to the opening 63 in the tube 56.

The filter elements 36, when in their lowered position, travel through an annular trough 160 to which filtrand is furnished through pipe 78 (Fig. 1). Trough 160 is supported by means of suitable brackets 161 attached to the filter shell and is insulated therefrom by means of any suitable insulating material 79, thus preventing heat from passing through the metallic shell and brackets into the filtrand. Within the filtrand admission pipe 78 is placed an insulating expansible joint 80.

As the filtrate passes through the filter cloth, it falls to the bottom of the filter element and flows up, through the conductor pipe 74, into the tube 56; and when the filter leaf is rotated through approximately 79°, a substantial portion of the filtrate therein will drain into the tube 56. The filter elements 36 and tubes 56 and 40 are turned about their axes by means of straps or chains 76 secured at their lower ends to the lowermost portions of the quadrants 55 and at their upper end to rods 77 hung from arms 21.

It is apparent that as the rollers 22 on arms 21 ride up on the inclined surfaces of cam 23 (Fig. 4) the filter elements will be swung through approximately 92° to effect their removal from the filtrand and their placement in position for the blow-back. At the same time the openings in the tubular shaft 40 and sleeve 48 are registering with the opening communicating with the blow-back gas inlet 45.

At the opposite side of the shell from the filtrand inlet 78 is placed a wax flume 81. This flume extends down through the annular trough 160 (see also Fig. 4) which is cut off from communication therewith by transverse walls 82. The wax flume is elongated in the region of the top of the trough 160 and tapers down to a square shape immediately below the trough, from which it merges into a circular piece 83 extending within a nozzle 84 in the wall of the outer casing. The flange on the lower end of the nozzle 84, extending outside the casing, is bolted or otherwise affixed to means for transporting the wax either to storage or to a means for further treating the same.

Figures 2, 2A:
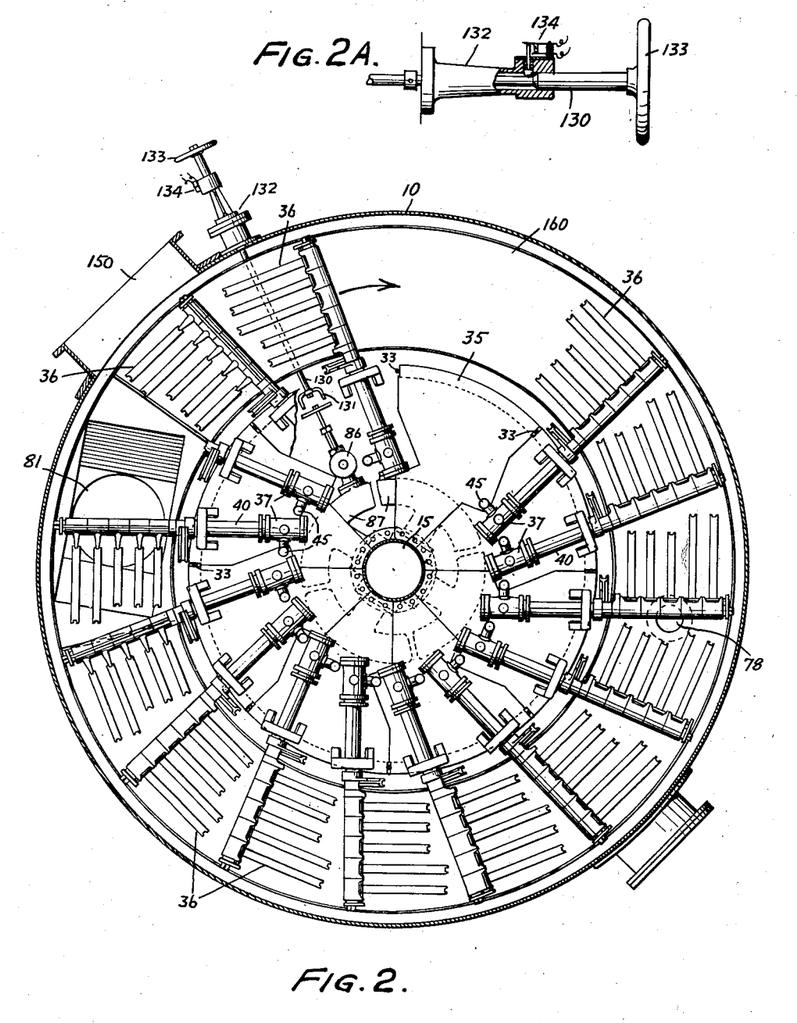
Fig. 2 is a section taken on lines 2—2 of Fig. 1.
Fig. 2A is an enlarged detail of a portion of the mechanism for temporarily stopping the rotation of the filter elements and removing one section thereof from communication with the outlet.
Figure 3:
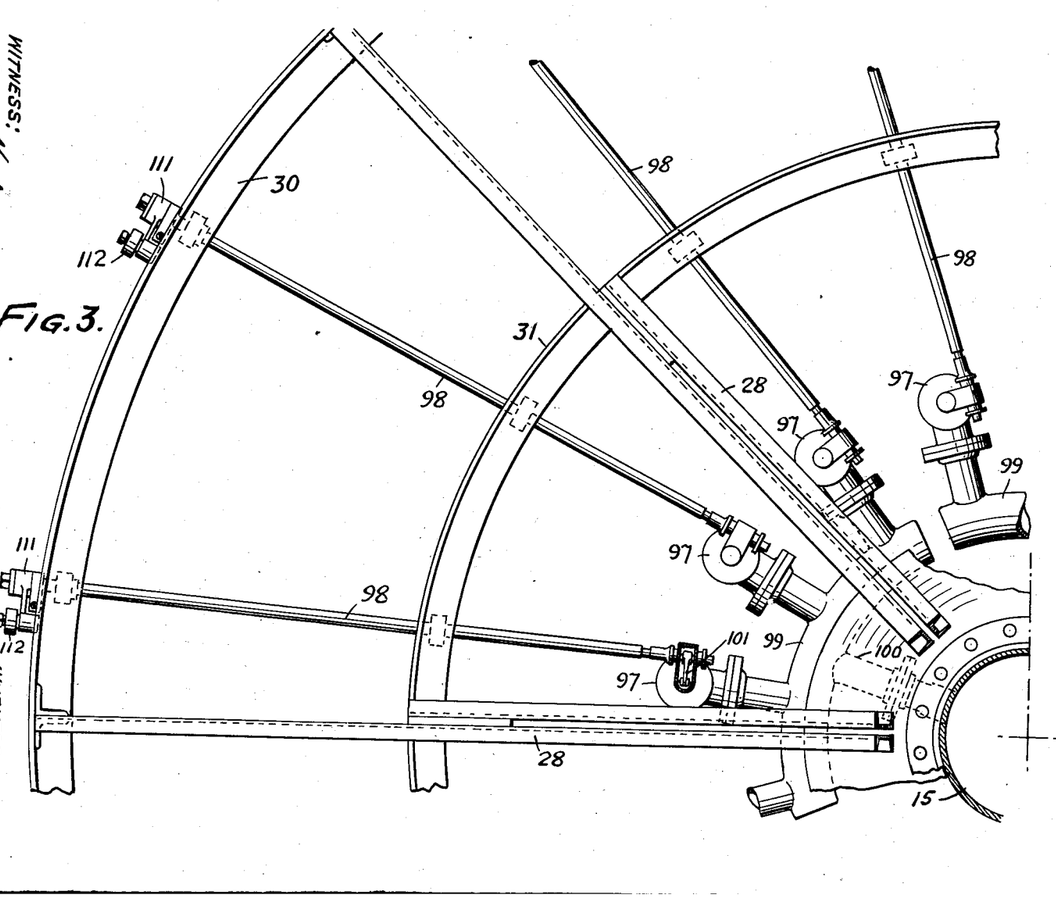
Fig. 3 is a section taken on line 3—3 of Fig. 1.

The filtrate, after passing through the valves 37 at the ends of the filter arms, flows down through pipes 46, having valves 86 therein, to a manifold 87 which, as shown in Fig. 2, has four inlets each serving one filter arm. There are four such manifolds, each of which communicates with the central shaft and is bolted or otherwise affixed to a casting 88 which in turn is affixed to the shaft 15, thus making it necessary to provide only four openings 89 in the shaft 15 and consequently not greatly reducing its strength.

Immediately below the openings 89 there is welded, inside the shaft 15, an annular hood 90, the purpose of which will be hereinafter explained. From the lowermost position of each of the pipes 46 a horizontal pipe 91 extends through the shaft 15 and, at a particular point in its rotation, passes over a stationary vertical pipe 92 within shaft 15 and a nozzle 93 at the lower portion of the outside wall of the vessel. Pipe 92 communicates through line 94 with a gauge glass 95 positioned outside the nozzle 93. From the lower end of the gauge glass 95 a line 96 extends into a fitting on the lower end of the nozzle 93. Since the discharge end of pipe 91 passes over pipe 92 about midway of the filtration portion of the cycle, pipe 46 will be quite well filled with filtrate, a little of which will pass out through line 91 instead of through manifolds 87.

As the outlet end of pipe 91 passes over pipe 92, filtrate will pass thereinto and thence down and into the gauge glass, thus permitting the operator to ascertain whether or not there is any wax suspended in the filtrate, which fact would indicate that the cloth had become ruptured or that some other break or leak had occurred permitting unfiltered material to enter the filtering elements and tubular shaft 40. The filtrate passing into the manifolds 87 and thence into the shaft 15 through the openings 89 cannot enter the pipe 92, as the annular shield 90 extends below the upper end of the pipe 92.

The pipes 45 furnishing the blow back gas to the filter elements extend upward to valve mechanism 97, the operation of which is controlled by rods 98. A flange on each valve casing (see Fig. 3) is bolted to a flanged pipe which communicates with a manifold 99, which in turn communicates with the central shaft 15 through a line 100. Operation of each of the valves 97 is carried out by means of a lever 101 positioned on top of the valve and operated by partial rotation of the corresponding rod 98.

Since there are sixteen blow back valves, each of which communicates with a manifold serving four valves, it is necessary to provide only four openings in the upper end of the shaft 15, thus not greatly reducing its strength. Below the openings 102 communicating with manifolds 99 there is welded a diaphragm 103 that completely seals the upper portion of the shaft 15 from the lower portion. Further up in the shaft 15 there is positioned another diaphragm 104 having a line 105 connected thereto and opening therethrough. Line 105 extends through the cover 106 of the filter, through a packed joint, to a fitting 107, to which is connected a line 108 furnishing the blow-back gas.

In the upper portion of the filter there is also provided lines 109 and 110 which serve to admit oil to, and allow it to flow from, the bearing structure supporting the filter mechanism.

The outer end of each rod 98 operating a blow back valve 97 is provided with a lever 111 (see Fig. 9) having a roller 112 on the end thereof. Lever 111 is free to rotate about rod 98, but its rotation relative thereto is restricted by means of set screws in projections 113 on a collar 114 fixed on rod 98.

Positioned about the wax chute 81, and arranged so as to contact the rollers 112, is an adjustable cam composed of parts 115 and 116. The outer side of the entry side of the cam 115 is provided with markings 140 to facilitate setting of the apparatus. For instance, if a valve 97 is to begin opening when the corresponding wheel 112 is in the position shown in Fig. 9, the upper set screw is turned down to just the point where it contacts with a lug 141 on lever 111. The lock nut is then tightened. The lower set screw is then fixed to limit the fall of the arm 111 when the wheel 112 passes toward the end of the cam 116 in order that it will not fall below the level of the entry side of cam 115. As the roller rides up cam 115 beyond the position shown in Fig. 9, shaft 98 is turned to open the corresponding blow-back valve.

Figures 9, 11:
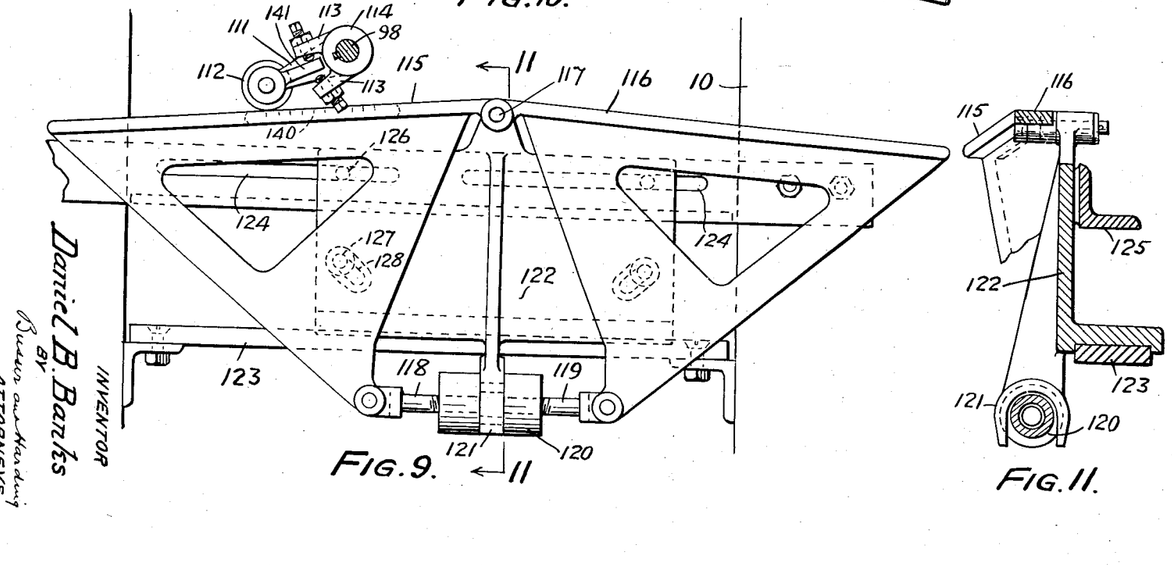
Fig. 9 is a view showing the adjustable cam arrangement for operating the blow back valves.
Fig. 11 is a section taken on line 11—11 of Fig. 9.
Figure 10:
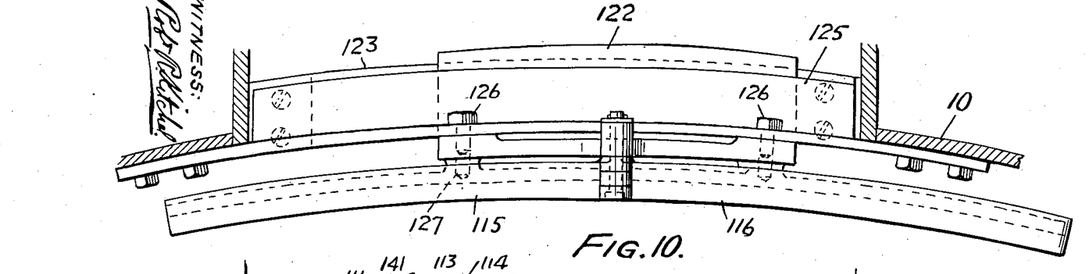
Fig. 10 is a plan view partly in section of the structure shown in Fig. 9.

Cams 115 and 116 are pivoted at 117 on a support 122 and, by means of bolts 118 and 119, engaging with the nut 120, are held within a fork 121 on the end of a bracket secured to support 122 (see Fig. 11).

Bolts 118 and 119 are provided with opposite threads so that proper adjustment may be made. The support 122 for the cams 115 and 116 is slidably mounted upon a track 123 secured to the shell 10 and is held in place by bolts 126 passing through slots 124 in a strip 125 secured to the shell 10. The general position of the cams 115 and 116 with respect to the chute 81 may be thereby suitably adjusted. Bolts 127 extend, through slots 128 in plate 122, into threaded holes in cams 115 and 116, thereby providing means for clamping these cams in any desired position and limiting the movement thereof.

It is apparent from the foregoing that the operation of the valves 97 can be very closely controlled to bring about proper blow back conditions, proper adjustment being extremely necessary with varying speeds of the filter. It is well known that filter rates fall off rapidly as the filter cake grows in thickness. Therefore, if filter rates are high the apparatus must be speeded up to prevent too thick a cake accumulating, thus cutting down yields. From consideration of Fig. 4 and from the description of the operation of the valves 37, it will be apparent that the time when the vacuum valve begins to close and the time it is fully closed are fixed, regardless of the speed of revolution, by means of the fixed cam 23. The times, however, for beginning to open the blow-back valve, the time during which it is fully open, and the time for closing it, may be very carefully controlled by proper manipulation of cams 115 and 116.

If inspection of gauge glass 95 shows that the stream being pulled from one filter section is cloudy, thus indicating a leak or filter cloth rupture, that particular section may be cut off from communication with the filtrate outlet by operation of valve 86. As shown in Figs. 1 and 2, there is provided a shaft 130 having a forked end 131 extending into the filter shell adjacent the line of travel of the hand wheels on the valves 86. The shaft 130 passes through the shell through a nozzle 132 having suitable packing associated therewith to prevent gas leaking from the shell. The shaft terminates in a hand wheel 133. By reference to Fig. 2A, it will be noted that the outer end of the shaft 130 is larger in diameter than the inner portion. Where the larger diameter converges to the smaller diameter, a cam face is formed which is utilized to operate switch 134 which is diagrammatically illustrated in Fig. 2A. In order to cut off a filter arm from communication with the filtrate outlet, the rotation is watched until the valve 86 controlling that portion which it is desired to eliminate from the system comes opposite the shaft 130, at which time the main switch controlling the driving motor is cut off, thus stopping rotation of the shaft 15. Handwheel 133 is then pushed, opening switch 134 which is connected in series with the main switch, thus preventing the starting of the motor. Further inward movement of the handwheel 133 engages fork 131 with the spokes of the handwheel on valve 86, permitting it to be turned to a closed position, after which operation shaft 130 is withdrawn, closing the switch 134 and permitting rotation to be resumed when the main switch is again closed.

A fluid level of filtrand is maintained in the annular trough 160 by means not shown, which means will control an inlet valve situated in line 78.

The lower end of shaft 15 is provided with a flange and wear sleeve 135 which is machined to fit closely within an annular member 136 fastened to the outer shell 10. Suitable packing means to prevent leakage of gas or liquid, such as packing 138, are held in place by gland 139.

The filter structure herein shown is easily assembled. The shaft 15, having wear sleeve 135 affixed thereto, is lowered through the top of the manhole and set within the bearing 136 affixed to the bottom of the casing 10. The spur gear 14, which is made up in sections which readily pass through manhole 150, is then assembled in its proper position. The element 13, together with the bearings associated therewith, is then lowered through the manhole 113 and the bolts 20 are put in position and drawn up lifting the shaft 15 from the shoulder provided by the bottom of the bearing 136. The spur gear 14 and the shaft 15 will then be suspended entirely from element 13 and the bearings associated therewith. The arms 21 and guides 27 are next assembled, it being understood that the cam 23 and its supports 24 and 25 are already in place, after which the radial arms 28 and their associated structural elements are put in place. The lower manifolds 87, together with the valves and fittings associated therewith, are next put in position and the plate 35 is assembled above them, upon which the shafts 40, valves 37, valves 97 and the necessary piping and fittings are installed. The filter leaves 36 are then placed upon the shafts 40 and the mechanism adjusted for operation.

From the foregoing description, the operation of the apparatus will be understood. The shaft 15 and the mechanism carried thereby are rotated and the mixture of oil-propane solution and wax is pumped through the line 78 into the trough 160. The filtrate from the filter sections that are immersed in the mixture flows continuously through the corresponding tubular shafts 56 and 40, pipes 86, manifolds 87 and the lower section of shaft 15 and thence to a locus of further treatment for separation of the propane from the oil. Successively the bodily rotating arms 21 ride up the high sections of stationary cam 23 and turn the corresponding tubular shafts 56 and 40 on their axes to swing the corresponding filter sections out of the trough and connect them and the tubular shafts with the corresponding blow-back gas pipes 45. At the points in its travel, predetermined by the adjustment of stationary cams 115 and 116, at which a roller-carrying lever 111 riding on a cam 115 turns the corresponding rod 98 on its axis to open the corresponding valve 97, blow-back gas is admitted under pressure through pipes 108 and 105, the upper section of shafts 15 and, through one of the manifolds 99, into pipe 45, tubular shafts 40 and 56, and thence into the corresponding filter section 36, blowing the cake of wax thereon into the wax discharge chute 81. Soon thereafter, as the roller-carrying lever rides down cam 116 and turns the corresponding rod 98 to close valve 97, the flow of blow-back gas is shut off, after which the corresponding arm 21, riding down to the low section of cam 23, turns the corresponding tubular shafts 56 and 40 and filter section 36 back into the trough 160, thus again immersing it in the filtrand, whereupon its filtering function, and the flow of filtrate therefrom through tubular shafts 56 and 40, the corresponding pipe 46 and the lower section of shaft 15, are resumed.

Inspection of the by-passed filtrate that flows through the glass gauge 95 enables the operator to determine if and when any particular filter section is not functioning properly and, by the described manual operation of shaft 130, the rotation of the apparatus can be stopped, the defective filter section cut out by closing the corresponding valve 86 and the apparatus restarted.

An important feature of the described apparatus is that the moving parts are all supported from a central shaft, which in turn is supported from a single bearing structure, the central shaft being used as a means for removing filtrate from the filter and as a means for admitting blow-back gas thereto. It is also evident that the arrangement for rotating the filter leaves to lift them from the filtrand, carry them over the wax removal section and place them again in the filtrand is one which is perfectly balanced and which requires only straight vertical motion. It will be noted, by consideration of Fig. 4, that each time one of the wheels 22 is riding up on the cam track 23 to remove one set of leaves from the filter, another wheel 22 will be traveling down the opposite end of the cam track, thus balancing the apparatus.

It will also be observed that it is only necessary to support the weight of the filter leaves by the lifting cam 23, as the leaf-carrying elements 56 and 40 are entirely supported from the structure 28.

The maximum amount of time is permitted for the leaves to remain within the filtrand, as the leaf structure and the means for removing and again depositing the leaves in the filtrand are so arranged as to have the leaf in contact with the filtrand practically up to the time it is removed for the purpose of removing the accumulated wax cake. It is evident from Fig. 4 that in a structure as here shown having sixteen filter sections, three-quarters, or twelve of the sections, will be in the filtrand while only one-quarter, or the remaining four, are either in the process of removal from or in the process of returning to, the filtrand. It will readily be appreciated, comparing the present structure with the usual type of rotary, horizontal leaf or drum filters, that a filter embodying my invention possesses a much greater efficiency.

What I claim and desire to protect by Letters Patent is:

1. A filtering apparatus comprising an enclosing shell, an upright rotatable central shaft, an arcuate filtrand trough within the shell, a number of radiating tubular shafts rotatable bodily with the central shaft above said trough, a wax discharge, a filter carried by, and communicating with the interior of, each tubular shaft, a filtrate discharge and a blow-back gas pipe for each tubular shaft, means to turn each tubular shaft on its axis into two positions in one of which it swings its filter into the trough and in the other of which it swings its filter out of the trough, valve means operable in the first of said positions to connect said tubular shaft with its filter discharge and operable in the other of said positions to connect said tubular shaft with its blow-back pipe while it is traveling over the wax discharge, and means operable in the rotation of the central shaft to so actuate the several tubular shafts successively.

2. A filtering apparatus comprising an enclosing shell, an upright rotatable central shaft, an arcuate filtrand trough within the shell, a number of radiating tubular shafts rotatable bodily with the central shaft above said trough, a wax discharge, a filter carried by, and communicating with the interior of, each tubular shaft, a filtrate discharge and a blow-back gas pipe for each tubular shaft, means to turn each tubular shaft on its axis into two positions in one of which it swings its filter into the trough and in the other of which it swings its filter out of the trough, valve means operable in the first of said positions to connect said tubular shaft with its filter discharge and operable in the other of said positions to connect said tubular shaft with its blow-back pipe while it is traveling over the wax discharge, a valve in each blow-back pipe, and means operable in the rotation of the central shaft to successively actuate the several tubular shafts as specified and, while a blow-back pipe and tubular shaft are so connected, operate said valve.

3. A filtering apparatus comprising an enclosing shell, an upright rotatable central shaft, an arcuate trough for the filtrand within the shell, a series of filters rotatable with the shaft, means rotatable with the shaft and connected with the filters and adapted during their rotation to move them into and out of the trough, a filtrate discharge, means operable in the rotation of the shaft to maintain open communication between each filter and the filtrate discharge while it is traveling through the trough, by-pass means adapted to be brought into open communication with each of the streams of filtrate flowing from each filter during a portion of the time that each filter is moving through said trough in order to divert a small portion of said stream of filtrate, means in said by-pass for visually inspecting said filtrate in order to detect any defective operation of such filter, and a valve operable to close communication between such filter and the filtrate discharge to thereby render inoperative a defective filter.

4. A filtering apparatus comprising an enclosing shell, an upright rotatable central shaft, an arcuate filtrand trough within, and extending a greater part of the way around the shell, a number of radiating tubular shafts rotatable bodily with the central shaft above said trough, a filter discharge between the ends of the trough, a filter carried by and communicating with the interior of each tubular shaft, a blow-back gas pipe and a filtrate discharge pipe for each tubular shaft, means to turn each tubular shaft on its axis into two positions in one of which it swings its filter into the trough and in the other of which it swings its filter out of the trough, valve means operable in the first of said positions to connect said tubular shaft with its filter discharge and operable in the other of said positions to connect said tubular shaft with its blow-back pipe while it is traveling over the wax discharge, a cam-way extending within and around the shell, radial members rotating with the shaft and rolling over the cam-way, and connections between said radial members and the respective tubular shafts adapted to effect the turning of the latter successively on their axes as specified.

5. A filtering apparatus comprising an enclosing shell, an upright rotatable central shaft, an arcuate trough for the filtrand within the shell, a series of filters rotatable with the shaft, means rotatable with the shaft and connected with the filters and adapted during their rotation to move them into and out of the trough, a filtrate discharge, means to convey filtrate from each filter to the filtrate discharge while it is traveling through the trough, a source of blow-back gas under pressure, a valve adapted to open connection between said source and each filter while it is out of the trough and thus in non-filtering position, a rod adapted to operate said valve, said rod and valve being bodily rotatable with the central shaft, a roller carrier by said rod, a stationary cam along which said roller is adapted to travel while said filter is out of the trough and by which the operation of said roller and rod is controlled to turn said valve successively into open and closed position, means to adjust said cam along the path of travel of said roller and means to adjust said roller relative to said rod to thereby control the time of opening and closing of said valve and the length of time during which it remains open.

6. A filtering apparatus comprising an enclosing shell, an upright rotatable control shaft, operating means for rotating said shaft, an arcuate trough for the filtrand within the shell, a series of filters rotatable with the shaft, means rotatable with the shaft and connected with the filters and adapted during their rotation to move them into and out of the trough, filtrate discharge pipes, with which said filters respectively communicate while the filters are traveling in the trough, a valve on each filtrate discharge pipe which is operable to close said pipe and render the corresponding filter inoperative, valve operating means extending through said shell and operable from the exterior thereof for closing one of said last named valves, and means actuated by the operation of said valve operating means for rendering said operating means for rotating said central shaft inoperable during said closure of said valve.

DANIEL B. BANKS.